Oct. 31, 1950     H. A. QUIST     2,527,892
LIQUID SEALED VALVE

Filed Dec. 27, 1944     2 Sheets-Sheet 1

WITNESS:
Rob R Kitchel.

INVENTOR
Harold A. Quist
BY
Busser and Harding
ATTORNEYS

Oct. 31, 1950      H. A. QUIST      2,527,892
LIQUID SEALED VALVE

Filed Dec. 27, 1944      2 Sheets—Sheet 2

WITNESS:
Rob'r P. Kitchel.

INVENTOR
Harold A. Quist
BY
Buser and Harding
ATTORNEYS.

Patented Oct. 31, 1950

2,527,892

UNITED STATES PATENT OFFICE 2,527,892

LIQUID SEALED VALVE

Harold A. Quist, Drexel Hill, Pa., assignor to Sun Oil Company, Philadelphia, Pa., a corporation of New Jersey Application December 27, 1944, Serial No. 569,934

2 Claims. (Cl. 137—53)

This invention relates to liquid sealed valves and in particular is directed to a valve of this type which is designed for controlling properly vapor or gas release from pressure chambers or storage vessels.

Liquid sealed valves are particularly useful with large vessels which are utilized for storing volatile liquids since the valves may be so constructed as to permit small pressures to build up in a vessel before the vapors or gas will be discharged, thus reducing the evaporation loss which would be considerable if the vessels were vented freely to the atmosphere. Liquid sealed valves have not been successful for several reasons. One practical difficulty in the use of these valves is in preventing loss of the sealing liquid when the valve is opened, due to the liquid becoming entrained and carried away by the discharging gases. This requires frequent inspection of the valves in order to replenish the liquid as required to maintain constantly sufficient liquid in the valve to effect the seal. Another defect is in the failure of the valves to respond to small pressure changes. Consequently, when the valves have opened they often remain open so long that there is an unnecessary release of large volumes of the vapor or gas.

The present invention provides a liquid sealing valve so designed as to open at a predetermined maximum pressure and to close at a predetermined minimum pressure and during the period when the valve is open there is no loss of the sealing liquid. The construction of the movable valve member is such as to provide for a quick opening and quick closing of the valve in response to small pressure changes. The relative arrangement of the movable valve member to the stationary valve parts is such as to prevent sticking or freezing of the parts and thus provide for continuous operation of the valve under all weather conditions. Refinements of the invention provide for maintaining constantly a predetermined volume of sealing liquid in the valve apparatus in order to take care of evaporation losses and provision is also made for draining the liquid from the apparatus when it is desired.

In order to facilitate an understanding of the invention, reference may be had to the accompanying drawings which are to be considered exemplary of the invention.

Figure 1:
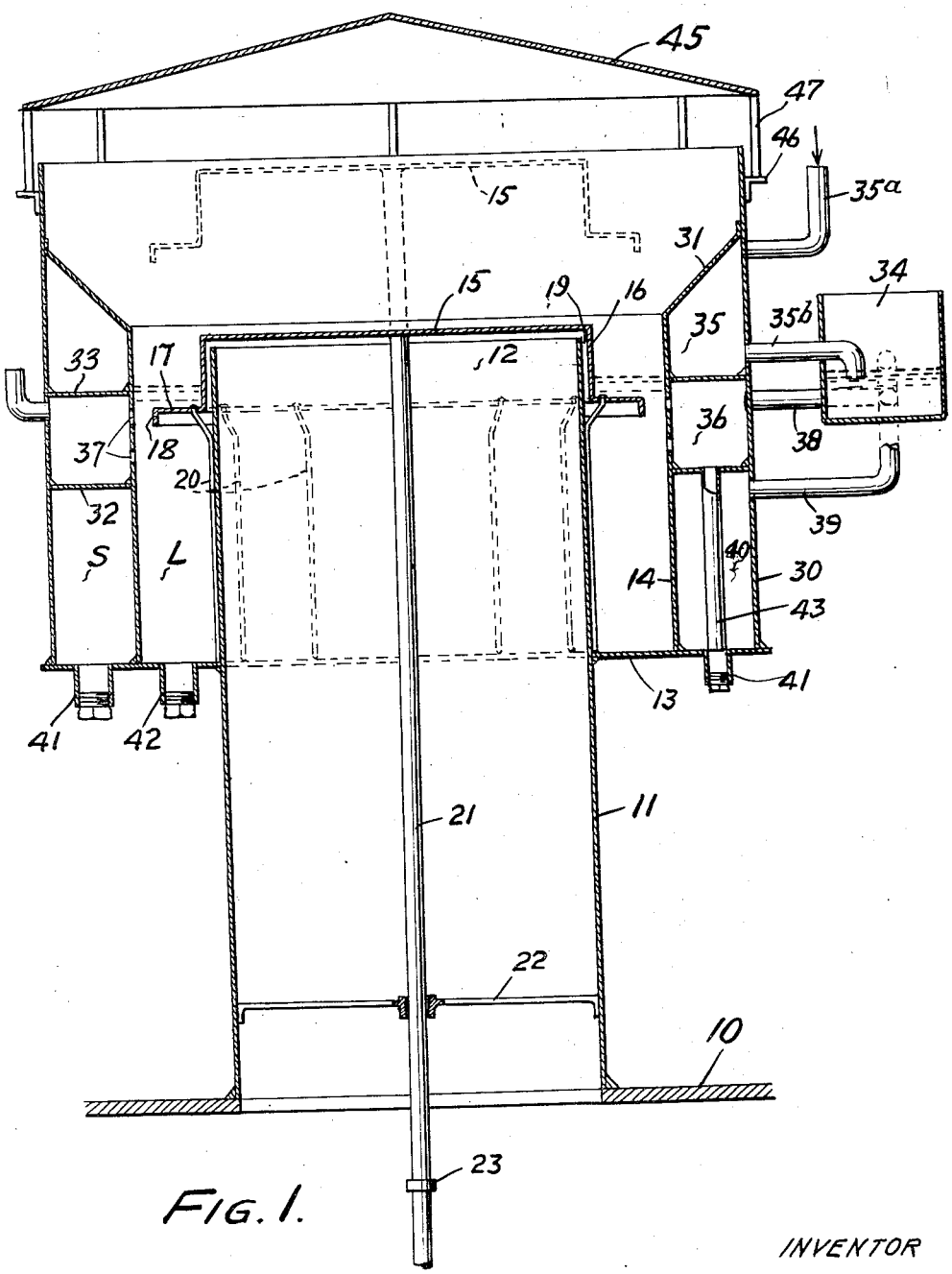
Fig. 1 is a vertical sectional view of the device shown in operative relation with the gas outlet of a pressure chamber.
Figure 2:
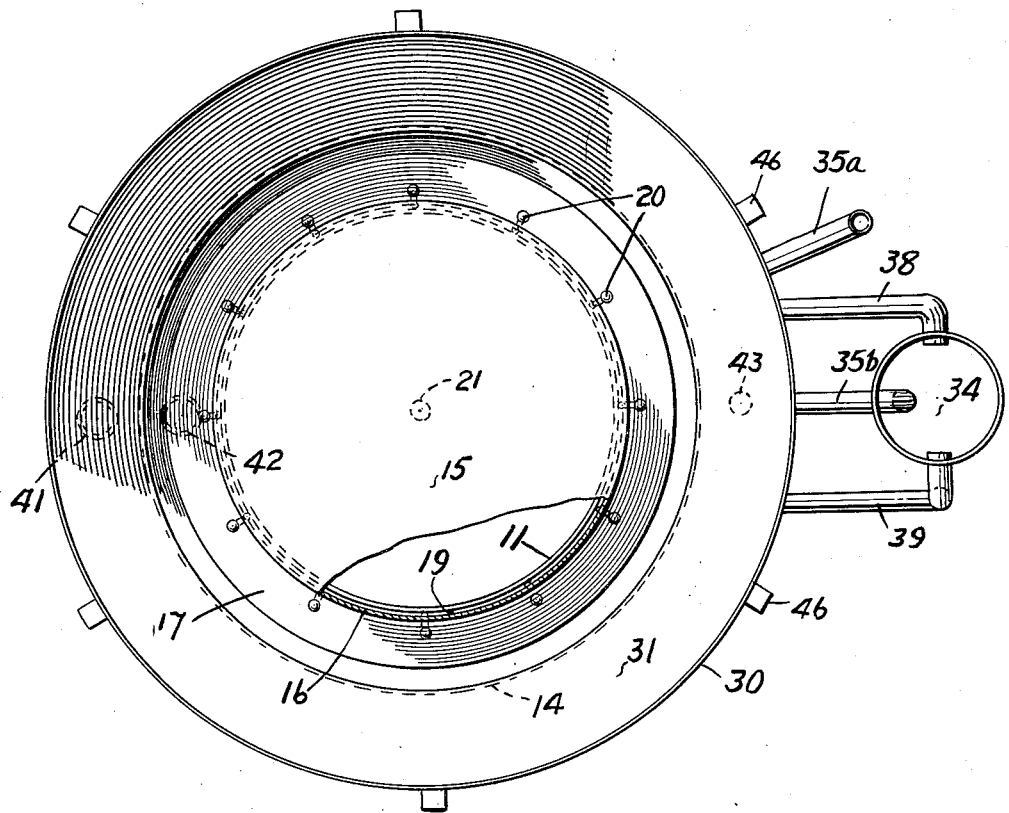
Fig. 2 is a plan view of the device with a portion removed for the purpose of clarity.

Referring to Fig. 1, the numeral 10 designates the wall of a pressure tank or chamber and 11, a gas outlet conduit through which gases, formed in the chamber, are released to the atmosphere. A generally annular chamber L is provided for the sealing liquid and is formed between inner and outer peripheral walls. The conduit 11 may conveniently be utilized to provide one of these walls and as illustrated the upper portion 12 thereof forms the inner wall of the chamber. The chamber L is completed by the addition of the bottom wall 13 and the outer wall 14 which are secured together in a manner to make the chamber leak-proof and to provide an upper open end. Depending upon the conditions of use of the valve, and particularly upon weather conditions, water, oil, brine, glycerine, or some other low freezing liquid may be used as the sealing liquid.

A reciprocatory valve member is provided for controlling gas discharge from chamber 10 and it is generally bell-shaped having a cover portion 15 which extends across the open end of the inner wall of chamber L and a sidewall 16 which extends downwardly into the chamber to enclose the open end of the inner wall when the valve is in closed position. A lateral flange 17 extends outwardly from the depending side wall and terminates in a downwardly extending flange 18, which forms a pocket with the lateral flange. Provision is made to prevent the reciprocatory valve member from contacting the stationary parts of the device in order to eliminate the possibility of the respective parts sticking together which would otherwise occur, particularly when the valve is used on petroleum storage tanks, because of gum formation. To this end, the side wall 16 of the reciprocatory valve member is of slightly greater diameter than that of wall 12 forming a space 19 therewith and the width of flange 17 is such as to permit it to move freely in chamber L and stop means 20 are provided to prevent the cover 15 from contacting the upper edge of the inner wall of chamber L. As shown, the stop means 20 may conveniently take the form of spring fingers which have one end secured to the lateral flange 17 and the other end resting on the bottom wall 13 when the valve is closed but which are bent inwardly to press against or ride the wall 12 of chamber L when the valve member is actuated and thus function additionally to guide the valve member during its reciprocating movement. A rod 21 secured centrally of the cover 15 is also provided and depends therefrom to give balance to the valve member during its reciprocation and an apertured guide 22 is provided to cooperate with shoulder 23 on the rod to limit the upward movement of the valve member.

In order to maintain a predetermined volume of liquid in the chamber L and thus provide a constant liquid level therein an auxiliary chamber indicated generally at S is provided by extending the bottom wall 13 of chamber L laterally and securing thereon the casing wall 30 spaced a suitable distance from wall 14. The chamber at its upper end is covered by a plate 31 secured to wall 14 and the casing wall 30. The chamber S is divided into a plurality of superposed compartments by partitions 32 and 33 and these compartments are by means of conduits placed in communication with a reservoir 34 in such a manner as to control the level of liquid in the chamber L. To this end the upper compartment 35 will be provided with a supply conduit 35a and another conduit 35b which is positioned therebelow to deliver the liquid to reservoir 34. The central compartment 36 is placed in communication with the chamber L through apertures 37 and a conduit 38 which is in communication with the reservoir 34 directs liquid therefrom into the chamber L. An overflow conduit 39 connects the reservoir 34 with the bottom compartment 40 and its inlet end is positioned in the reservoir at a level at which it is desired to maintain the level of the liquid in the chamber L. With this arrangement, if the liquid level in reservoir 34 should be higher than it is desired to maintain the level in the chamber L the overflow conduit 39 will remove excess liquid and the desired level in chamber L thus obtained.

In operation the chamber L is filled with liquid to the desired level, which will be slightly above the open end of the conduit 35b which is disposed in reservoir 34. Liquid supplied to the chamber L may be admitted first to conduit 35a which is in communication with storage compartment 35 or it may be admitted directly to reservoir 34 which is positioned outwardly of the valve housing in order that the various conduits 35b, 38 and 39 may be placed in communication therewith. After such liquid is supplied to the apparatus to fill the chamber L and also the reservoir 34 to the desired level, which is slightly above the open end of conduit 35b determined by the overflow conduit 39, the storage compartment 35 is then filled with liquid which is used to replenish any liquid which may have evaporated. The method of supplying liquid to storage compartment 35 is first to close the open end of conduit 35b and admit liquid to the compartment until the compartment is filled after which the open end of conduit 35a is closed and the closed end of conduit 35b opened and no liquid will flow from storage compartment 35 until the level of liquid in the reservoir 34 reaches a line below the open end of conduit 35b in the reservoir. When this occurs, air will pass through conduit 35b into compartment 35 which will in turn displace liquid therein into the reservoir 34 until the liquid in the reservoir again reaches the open end of conduit 35b at which time the level of the liquid in the apparatus is that desired. Any excess liquid which may have been admitted to reservoir 34 is removed by overflow conduit 39 in order to maintain the level of the liquid in the reservoir to the desired value or degree and the L-shaped vent shown in communication with chamber 36 at the left of the drawing is merely to remove any air trapped in the chamber 36.

When it is desired to flush the liquid from the entire apparatus, plugged openings 41 and 42 are provided in the bottom plate 13 to remove liquid from the lower compartment of chamber S and from chamber L directly while a liquid removal conduit 43 is placed in communication with the central compartment 36 and also with one of the plugged openings 41 in the plate 13 to drain the central compartment.

A readily removable cover 45 is provided to shield the aparatus and to reduce the accumulation of foreign matter. Lugs 46 extend outwardly from the casing 30 and provide seats to receive legs 47 which depend in spaced relation around the cover thus providing spaces therebetween for the passage of gas.

After the valve is installed liquid will be supplied to compartment 35 of chamber S and the desired level in chamber L will be attained as indicated by the dashed line which will be the same as that obtaining in reservoir 34. The weight of the reciprocatory valve member and other elements which move therewith will be such as to open instantly after some predetermined pressure is reached in the vessel 10. When this predetermined pressure has been reached the liquid in space 19 will have been forced downwardly to the lateral flange 17. During this period a perfect seal is maintained and there will be no loss of liquid from chamber L since the gases will not have passed through the liquid. Any infinitely small increase in pressure after the liquid has been forced downwardly to this level will be exerted on the lateral flange 17, and since the width and area of this flange is substantial, the valve member will be lifted upwardly, instantly. As the valve member is being forced upwardly the liquid in chamber L will be in agitation but by means of the flange 17 and the small depending flange 18 the liquid is prevented from being carried upwardly and out of the chamber. Of course, after the lateral flange 17 is lifted out of the liquid the liquid seal will be broken and the gas will pass directly out of the conduit 11 and there can be no carrying over of the liquid from the chamber. The valve member will be lifted upwardly as indicated by its dashed line position and will be limited in its upward movement by suitable stop means, for example, the shoulder 23 on rod 21 and cooperating stop member 22.

During the period when gas is being discharged through the valve the movable valve member will reciprocate between its dashed line position and the upper edge of the conduit 11 depending upon the pressure fluctuations in the vessel 10. When the valve member moves toward closed position and the inner edge of flange 17 comes in line with the upper edge of the conduit 11 the member will drop instantly and the liquid seal will again be effected. This is due to the fact that the pressure drop across the flange 17 is very great since the space between the upper edge of conduit 11 and the inner edge of flange 17 is very small while the space between the depending flange 18 and the outer wall 14 of the liquid chamber is relatively large. The pressure existing under the flange 17 when the flange is in line with the upper edge of conduit 11 is practically atmospheric while the pressure exerted on the flange during the time it moved downwardly from its dashed line position was the pressure of the gas in the chamber 10. Due to the fact that practically no pressure is exerted on the flange 17 when it is in line with the upper edge of conduit 11, the valve member drops instantly and the liquid seal is again effected.

By way of further explanation of the operation of the reciprocatory valve member it is to be understood from the construction of the liquid seal valve that the level of the liquid obtaining in the chamber is different during the opening operation of the valve member and during its closing operation. When the valve member descends from its dashed line or open position to its full line or closed position as indicated in Fig. 1, the level of the sealing liquid in the chamber will be at the same height completely across the annular space provided between the inner and outer walls 11 and 14, respectively, of the chamber. During the ascending movement of the valve member, or its movement when the valve is opening, the level of the liquid in the annular space between depending flange 18 and the outer wall 14 of the chamber will be higher than the level of the liquid obtaining in the remaining part of the chamber and this condition will exist until the lower edge of flange 18 is completely out of the liquid and at this instant the valve member will be forced upwardly in a snap action. This is due to the pressure difference existing between the space between depending flange 18 and the outer wall 14 of the chamber and the space defined by the annular flange 18 and the inner wall 11 of the chamber. As the valve is raised due to the pressure within the conduit or inner wall 11 the liquid in the annular space between conduit 11 and the large annular flange 16 of the valve member is forced downwardly and the lateral flange 17 is forced upwardly until the lateral flange 17 leaves the body of liquid within the chamber. However, at this time the small annular flange 18 is still within the body of the liquid and a column of liquid exists between this flange and chamber outer wall 14 which continues the liquid seal for some time after the lateral flange 17 has been moved to a position outside of the body of the liquid within the chamber. As the small annular flange 18 leaves the liquid or when the liquid seal is broken, as explained heretofore, the valve member snaps to open position and remains open until the pressure within inner wall or conduit 11 is decreased below a predetermined level at which time the valve member falls to the closed position.

What I claim and desire to protect by Letters Patent is:

1. A relief valve for controlling the discharge of gases from a storage vessel which comprises a chamber having inner and outer peripheral walls interconnected by a bottom wall, said inner wall comprising an inlet passage for gases, a reciprocatory valve member having a cover portion extending across the top of said inner wall and a flange depending from said cover portion into said chamber and surrounding said inner wall, a liquid in said chamber for sealing the lower portion of said flange, in combination with a liquid supply compartment positioned around said chamber adjacent its upper end, conduit means for supplying liquid to said compartment, a liquid reservoir for said compartment, conduit means for removing liquid from said compartment and supplying it to said liquid reservoir, other conduit means in communication with said chamber and said reservoir, and an overflow conduit in communication with said reservoir, said reservoir, compartment, and conduits providing means for controlling the level of liquid in the chamber.

2. A relief valve for controlling the discharge of gases from a storage vessel which comprises an open chamber having inner and outer peripheral walls interconnected by a bottom wall, said inner wall comprising an inlet passage for gases, a reciprocatory valve member in closed position having a cover portion extending across the top of said inner wall and an annular flange depending from said cover portion into said chamber and surrounding said inner wall in slightly spaced relation providing a restricted annular space therewith, a horizontal flange extending outwardly from the lower edge of said annular flange toward said outer wall of the chamber, a second annular flange depending from the outer edge of said horizontal flange, said second annular flange providing, with the outer wall of the chamber, a second annular space of substantially greater cross section than the restricted annular space provided between the first mentioned annular flange and the inner wall of the chamber, a body of liquid in said chamber maintained at one level above the horizontal flange of the valve member when in closed position in order to provide a liquid seal, the movement of the valve member to open position by the pressure of gases in said inlet passage lowering the level of the liquid in the restricted annular space and raising the level of the liquid in the second annular space to continue the liquid seal until after the horizontal flange of the valve member is raised completely out of the body of liquid and a plurality of guide members secured to the reciprocating valve member and spaced about the inner wall of said open chamber to prevent the valve member from tilting during its reciprocation.

HAROLD A. QUIST.

REFERENCES CITED

The following references are of record in the file of this patent:

UNITED STATES PATENTS

| Number | Name | Date |
| --- | --- | --- |
| 1,529,818 | Tuttle | Mar. 17, 1925 |
| 1,666,487 | Clements | Apr. 17, 1928 |
| 2,052,332 | Wiggins | Aug. 25, 1936 |
| 2,370,040 | Jackson | Feb. 20, 1945 |
| 2,371,961 | Ellis | Mar. 20, 1945 |

FOREIGN PATENTS

| Number | Country | Date |
| --- | --- | --- |
| 706,015 | Germany | May 15, 1941 |